United States Patent
Molenaar

(10) Patent No.: US 6,908,251 B2
(45) Date of Patent: Jun. 21, 2005

(54) TIE ROD END AND BALL JOINT COMBINATION

(75) Inventor: Kelly Molenaar, Kalamazoo, MI (US)

(73) Assignee: Howe Racing Enterprises, Inc., Beaverton, MI (US)

( * ) Notice: Subject to any disclaimer, the term of this patent is extended or adjusted under 35 U.S.C. 154(b) by 0 days.

(21) Appl. No.: 10/431,670

(22) Filed: Aug. 28, 2003

(65) Prior Publication Data

US 2005/0047851 A1 Mar. 3, 2005

(51) Int. Cl.$^7$ .................................................. F16D 1/12
(52) U.S. Cl. ...................................... 403/142; 403/145
(58) Field of Search ................................ 403/137, 138, 403/122, 145, 142, 143, 361

(56) References Cited

U.S. PATENT DOCUMENTS

| | | | | |
|---|---|---|---|---|
| 1,866,520 A | * | 7/1932 | Todd | 403/137 |
| 3,423,114 A | * | 1/1969 | Gottschald | 403/51 |
| 4,568,216 A | * | 2/1986 | Mizusawa et al. | 403/143 |
| 4,613,250 A | * | 9/1986 | Laucus | 403/122 X |
| 6,488,439 B1 | * | 12/2002 | Lackey, Sr. | 403/305 |

* cited by examiner

Primary Examiner—John R. Cottingham
(74) Attorney, Agent, or Firm—Robert L. McKellar; McKellar IP Law, PLLC

(57) ABSTRACT

Novel tie rod ends and ball joint combinations that are especially useful in racing vehicles in which high performance is desired. The devices provide a reduction in friction such that the required steering effort with regard to both the rotation and misalignment of tie rods can be managed to enhance the steering.

11 Claims, 3 Drawing Sheets

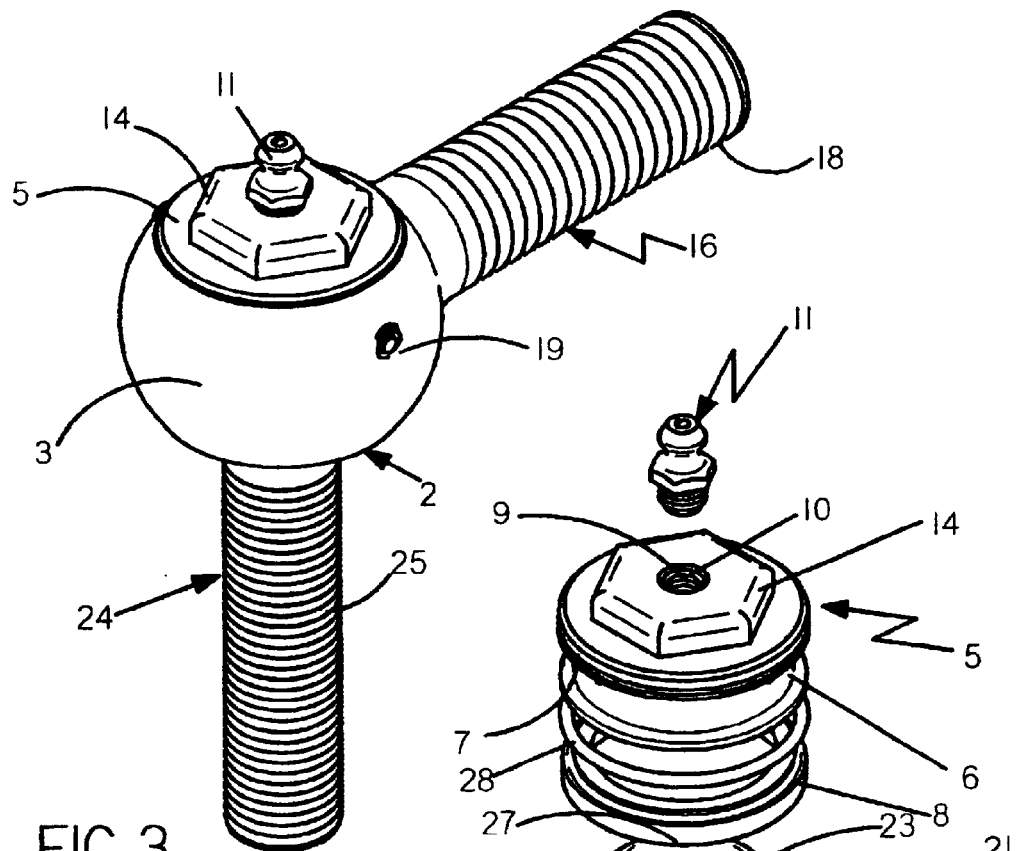
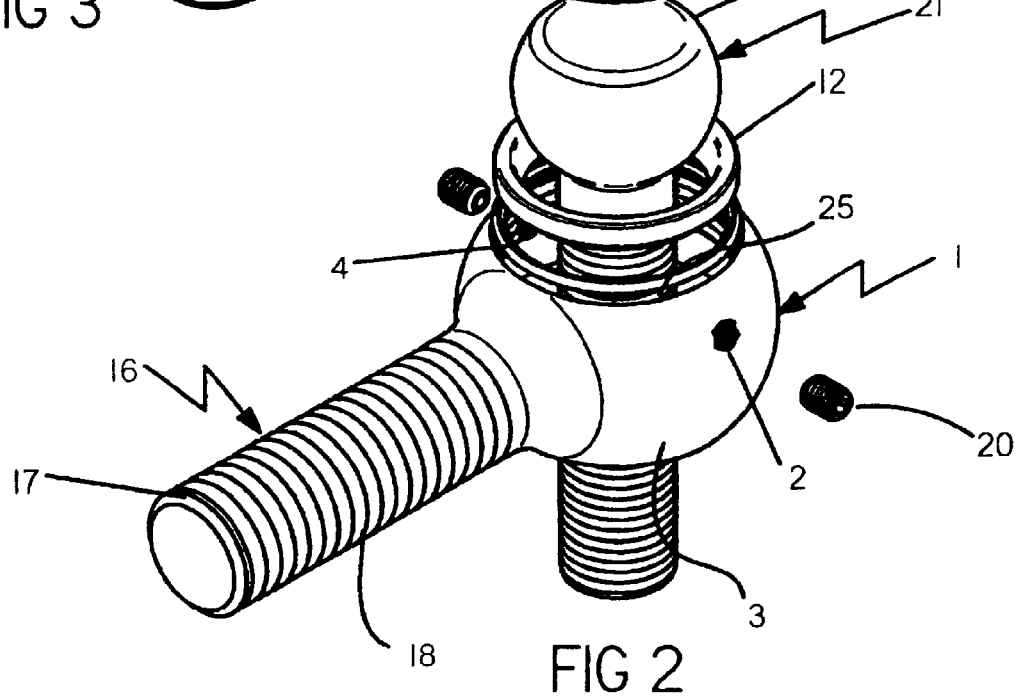

TIE ROD END AND BALL JOINT COMBINATION

The invention disclosed and claimed herein deals with a novel tie rod and the combination of the novel tie rod with a novel ball joint for automotive uses.

BACKGROUND OF THE INVENTION

The novel tie rod ends and ball joint combinations of this invention are especially useful in racing vehicles in which high performance is desired. The devices of this invention provide a reduction in friction such that the required steering effort with regard to both the rotation and misalignment of tie rods can be managed to enhance steering. The problem set forth Supra is magnified by the fact that there are most often at least four tie rod ends in automotive steering systems. The instant invention allows the fit of the ball and socket of the ball joint to be adjusted precisely to eliminate excessive play without having to preload the ball joint like prior art tie rod ends do. Existing tie rod ends contain a preloaded spring or wearable bushing to keep the ball seated in the housing and it is this pre-load that creates the excessive friction and decreases the ease of steering.

In commercial racing, it is desirable to alter the tie rod angles to effect handling, that is, bump steer and roll steer. The prior art situation is such that it requires modifying or replacing spindles and other costly steering linkages wherein usually, tie rod ends are crimped together because of that they must be replaced in their entirety. It is especially critical that the bump steer alignment be maintained so that both the akerman steering and stability of direction are maintained.

In a co-pending U.S. patent application Ser. No. 10/050,834, filed Jan. 15, 2002, and entitled Premium Performance Ball Joint and System, by the inventor herein, there is disclosed premium performance ball joints and systems that depend on a non-spring loaded ball joint.

The invention disclosed herein provides solutions to the problems set forth Supra and in addition, lends the advantages of the type of ball joints described in the co-pending application to be combined with the novel tie rod ends that are more durable that any of the prior art devices to provide advantages to the automotive community not available heretofore.

THE INVENTION

Thus, this invention deals with novel tie rod ends that are useful in combination with novel ball joints for automotive uses.

With more specificity, this invention deals with a tie rod end comprising a ball joint housing configured to accept a ball joint. The ball joint housing has a longitudinal center axis and an outside wall and is internally threaded to accept a retainer member.

The retainer member has external threads and is capable of being threaded into the ball joint housing. In addition the retainer member has an upper surface and a lower end, and there is a lubricating port located in the upper surface of the retainer member. The lubricating port is openly connected to a duct, and the duct provides a passageway for lubricants from the lubricating port to the truncated flat face of the ball. The retainer member is externally threaded on the lower end.

The ball joint housing has an extended externally threaded shaft on the outside wall that is mounted perpendicular to the longitudinal axis running through the center of the housing. The ball joint housing contains in it, a lower race for seating the ball of a ball joint therein and an upper race surmounting the ball of the ball joint, the lower and upper races being conformed to accept the ball and provide pivotal movement of the ball joint about the longitudinal axis of the elongated shaft for the ball joint relative to the housing.

The housing has an opening through the outside wall, wherein the opening is capable of receiving a fastening device therein for fastening the retainer member in the housing.

In another embodiment of this invention, there is a combination of the tie rod end and a ball joint, wherein the tie rod end is as described just Supra, and the ball joint comprises a ball joint elongated shaft having an upper end and a lower and has a longitudinal axis running through the upper end and the lower end. The ball joint elongated shaft is threaded on the lower end and has a ball rigidly fixed and surmounted on the upper end at the highest point opposite the attachment of the ball joint elongated shaft. The ball has an upper truncated flat face.

BRIEF DESCRIPTION OF THE DRAWINGS

FIG. 2 is an exploded full view of the combination of the tie rod and ball joint of this invention.

FIG. 3 is a full view in perspective of the combination of the tie rod and ball joint fully assembled except for the fastening device.

DETAILED DESCRIPTION OF THE INVENTION

Figure 1:
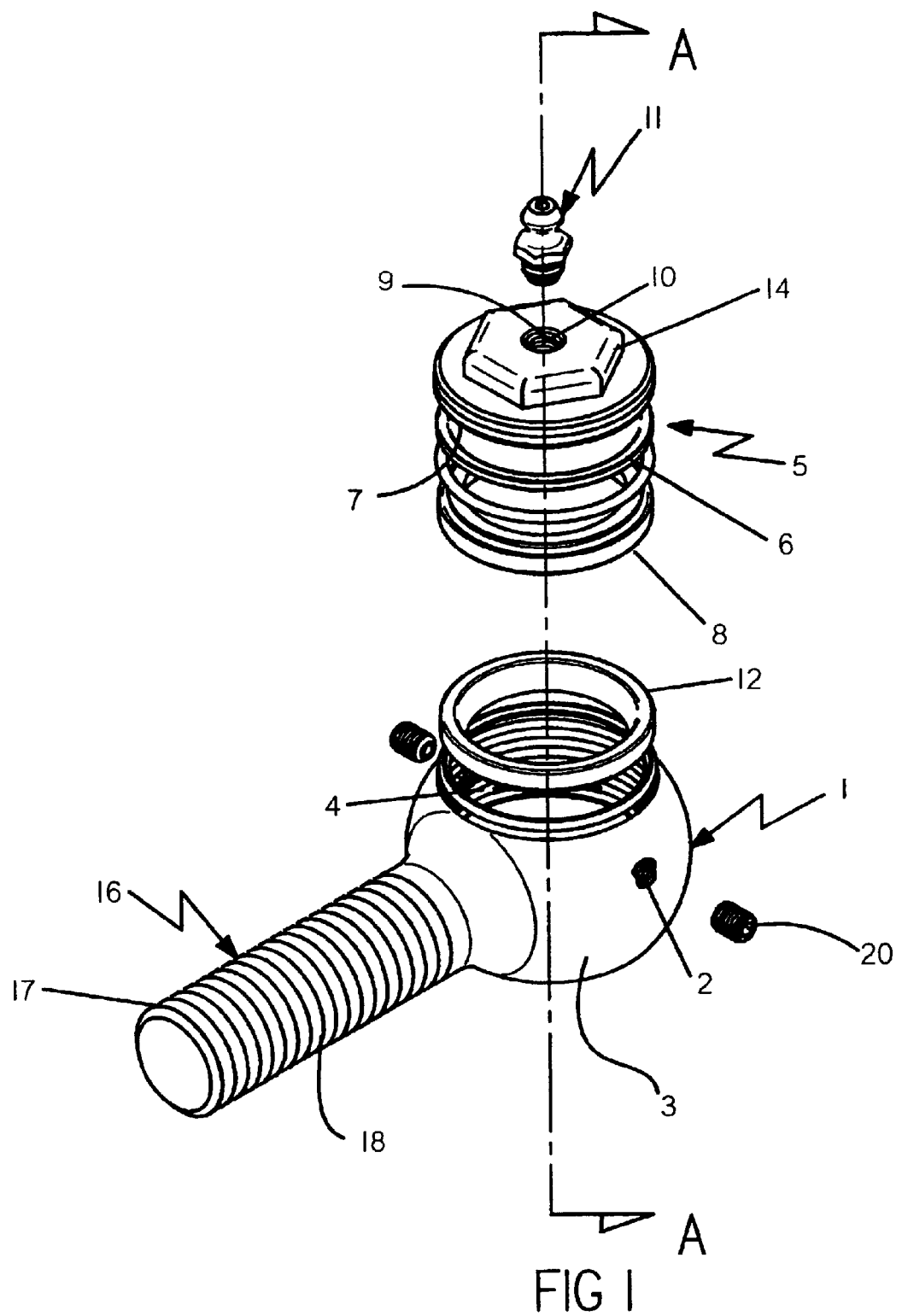
FIG. 1 is an exploded full view of the tie rod end of this invention.

Turning now to the Figures, and with reference to FIG. 1 which is an exploded full view of the tie rod end 1 of this invention wherein there is shown the ball joint housing 2 wherein the ball joint housing 2 has an outside wall 3 and a longitudinal center axis line A—A, wherein the internal surface of the housing is threaded as shown at 4.

At the top of the exploded view of FIG. 1, there is shown a retainer member 5, which retainer member 5 is externally threaded 6 near its lower end 7. The threads 6 are intended to mate with the internal threads 4 and allow for the retainer member 5 to be screwed into and retain the upper race 8 on the ball.

The retainer member 5 has an opening 9, in the upper surface 14 that is a duct that is internally threaded 10 to receive a grease zerc 11. The combination of the opening/duct 9 and the grease zerc 11 allows for the application of grease to the upper end of the ball 23 of the ball joint 21 (shown in FIG. 2) to facilitate lubrication of the ball 23 in the upper race 8 and the lower race 12.

The configuration 13 in the retainer member 5 is such that the retainer member 5 can be tightened or loosened and removed with a wrench or similar tool. The configuration of 13 is not critical as long as the retainer member 5 can be tightened and loosened.

On the outside wall 3 of the ball joint housing 2, there is mounted an extended shaft 16, that is threaded on its external surface 17 with threads 18, that can be used to mount the tie rod end on the tie rod of an automobile or the like. The extended shaft 16 is mounted such that it is essentially perpendicular to the center axis line A—A of the housing 2.

The internal opening of the housing 2 is configured such that the lower race 12 fits into the bottom of the housing 2, but does not pass through the housing 2 so that the bottom surface of the ball fits snugly into the lower race 12.

The upper race 8 and the lower race 12 are conformed to accept the ball 23 and provide pivotal movement of the ball joint 21 about the longitudinal axis A—A of the elongated shaft 22 (FIG. 2) of the ball joint 21.

The outside wall 3 of the housing 2 contains an opening 19 (FIG. 3) that allows for the insertion of a fastening device 20 to hold the retainer member 5 in position. Note that the device does not contain a spring mechanism, or any other mechanism to apply pressure to the ball joint as it sits in the races 8 and 12. The fastening device 20 can be for example a threaded set screw as is shown in FIG. 1, or it can be any other device that is capable of holding the retaining member 5 in place, such as a key in a key way segment.

A fully assembled unit, with the exception of the fastening device 20 is shown in FIG. 3, and FIG. 2 is an fully exploded view of the tie rod end 1 in combination with a ball joint 21 showing the relative positions of the components.

With regard to FIG. 2, wherein like numbers designate like parts, there is also shown a ball joint 21 as it would be used in combination with the tie rod end 1.

Thus, there is shown the elongated shaft 22 and the ball 23. The elongated shaft 22 is threaded at its lower end 24 with threads 25. Also in the lower end 24 is an opening 26 to accommodate a cotter pin or the like to retain a nut or some other fastening device on the elongated shaft 22, the opening 26 shown in FIG. 3.

The upper surface 27 of the ball 23 is truncated such that it is a flat surface, such that is useful for retaining a small supply of grease that has been injected into the grease zerc 11.

It should be noted by those skilled in the art that the elongated shaft 22 can be essentially of any reasonable length such that it will accommodate its placement in the suspension system of an automobile. Also, it should be understood by those skilled in the art that the overall size of the tie rod end 1, the ball joint 21, and their combination can be any reasonable size, as long as they can be accommodated in the suspension system of an automobile, it being further understood that the elongated shaft 16 of the tie rod 1 can be of any size, or length that is reasonable for its use.

The tie rod end 21 is manufactured from a ductile metal such that it will retain its strength, but at the same time allow for moderate bending to accommodate the stresses of use.

In assembly, the tie rod 1 is fitted with a lower race 12, the ball joint 21 is inserted therethrough to seat in the race 12, and then the upper race 8 is placed on top of the ball 23. Thereafter, the retainer member 5 is screwed into the tie rod end 1 and compresses the races 8 and 12, and the ball joint 21 together such that ball joint 21 will yield to pivotal movement, it being noted by those skilled in the art that the grease zerc 11 may already be assembled into the top surface 14 of the retainer member 5. Before use, the device is filled with grease through the grease zerc 11, and then assembled in a suspension unit. During use, the device can be subjected to additional doses of grease to help keep the pressure on the ball joint 21 in the interior of the tie rod end 1.

Figure 4:
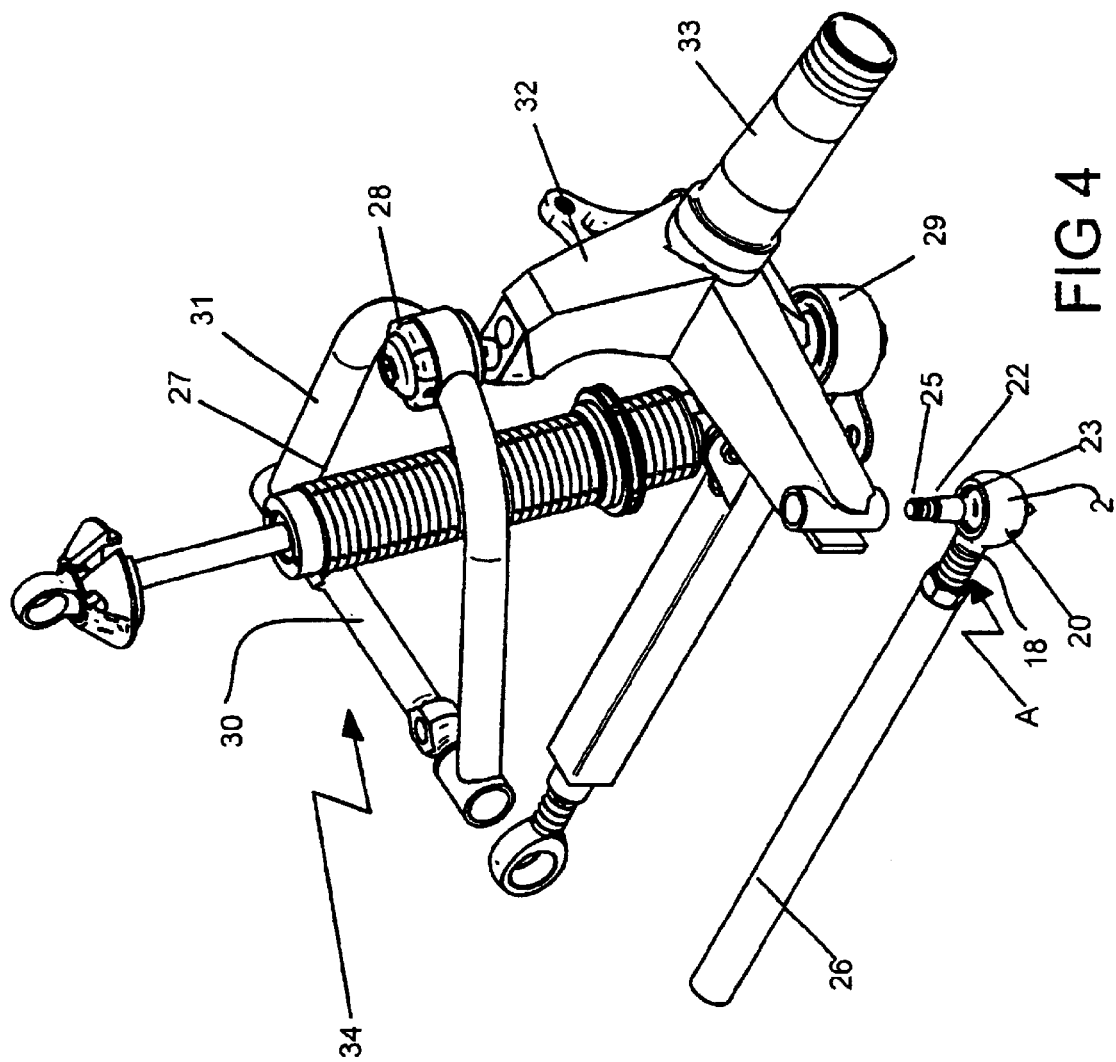
FIG. 4 is a portion of a suspension system showing the inventive tie rod bar.

Turning now to FIG. 4, wherein there is shown a portion of a suspension system 34 for an automobile, to allow one skilled in the art to appreciate how the novel tie rod is used, wherein there is shown the novel tie rod 26, a shock absorber 27, an upper ball joint 28, a lower ball joint 29, a support bar 30, wishbone support arms 31, a support arm 32, and a support stud (axle) 33.

What is claimed is:

1. A tie rod end consisting essentially of:
a ball joint housing configured to accept a ball joint; said ball joint housing having a longitudinal center axis and an outside wall and being internally threaded to accept a retainer member; said retainer member having external threads and being capable of being threaded into the ball joint housing, said retainer member having an upper surface and a lower end, said retainer member having a lubricating port located in the upper surface thereof, the lubricating port being openly connected to a duct, said duct providing a passageway for lubricants from the lubricating port to the interior of the ball joint housing, said retainer member being externally threaded on the retainer member lower end; said ball joint housing having an extended externally threaded shaft on the outside wall thereof, mounted perpendicular to the longitudinal axis running through the center of the housing; said ball joint housing containing therein, a lower race for seating the ball of a ball joint therein and an upper race surmounting the ball of the ball joint, said lower and upper races being conformed to accept the ball and provide pivotal movement of the ball joint about the longitudinal axis of the elongated shaft for the ball joint relative to the housing; said housing having an opening through the outside wall, said opening being capable of receiving a fastening device therein for fastening the retainer member in the housing.

2. The tie rod end of claim 1 wherein the race is manufactured from a hardened metal.

3. The tie rod end of claim 1 wherein it is manufactured from an alloy.

4. The tie rod end of claim 1 wherein the lower race is manufactured into the ball joint housing.

5. The tie rod end of claim 1 wherein the lower race is not manufactured into the ball joint housing.

6. The tie rod end of claim 1 wherein the upper race is manufactured into the retainer member.

7. The tie rod end of claim 1 wherein the upper race is not manufactured into the retainer member.

8. The tie rod end of claim 1 wherein the fastening device is at least one setscrew.

9. The tie rod end of claim 1 wherein the fastening device is a key segment.

10. An automotive suspension system wherein there is provided a ball joint system and a tie rod having a tie rod end as claimed in claim 1.

11. In combination, a tie rod end and a ball joint,
said ball joint consisting essentially of:
(i) a ball joint elongated shaft having an upper end and a lower and having a longitudinal axis running through said upper en and said lower end, said ball joint elongated shaft being threaded the lower end;
(ii) a ball rigidly fixed and surmounted on the upper end of the elongated shaft, said ball, at the highest point opposite attachment of the ball joint elongated shaft, having a truncated flat face;
said tie rod end consisting essentially of:
a ball joint housing configured to accept a ball joint; said ball joint housing having a longitudinal center axis and an outside wall and being internally threaded to accept a retainer member; said retainer member having external threads and being capable of being threaded into the ball joint housing; said retainer member having an upper surface and a lower end, said retainer member having a lubricating port located in the upper surface thereof; the lubricating port being openly connected to a duct, said duct providing a passageway for lubricants from the lubricating port to the truncated flat face of the ball, said retainer member being externally threaded on the retainer member lower end;

said ball joint housing having an extended externally threaded shaft on the outside wall thereof; mounted perpendicular to the longitudinal axis running through the center of the housing; said ball joint housing containing therein, a lower race and an upper race, said races being conformed to seat the ball of the ball joint and provide pivotal movement of the ball joint about the longitudinal axis of the elongated shaft for the ball joint relative to the housing, said housing having an opening through the outside wall, said opening being capable of receiving a fastening device therein for stabilizing the retainer member in the housing.

* * * * *